(12) United States Patent
Hunt et al.

(10) Patent No.: US 6,907,395 B1
(45) Date of Patent: Jun. 14, 2005

(54) SYSTEM AND METHOD FOR DESIGNING A LOGICAL MODEL OF A DISTRIBUTED COMPUTER SYSTEM AND DEPLOYING PHYSICAL RESOURCES ACCORDING TO THE LOGICAL MODEL

(75) Inventors: Galen C. Hunt, Bellevue, WA (US); Aamer Hydrie, Kirkland, WA (US); Robert V. Welland, Seattle, WA (US); Bassam Tabbara, Seattle, WA (US); Steven P. Levi, Redmond, WA (US); Jakob Rehof, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 09/696,707

(22) Filed: Oct. 24, 2000

(51) Int. Cl.⁷ .................................. G06F 9/44
(52) U.S. Cl. ................. 703/21; 709/201; 709/203; 709/226
(58) Field of Search ................. 703/21; 709/200, 709/201, 202, 226, 203, 218; 712/28

(56) References Cited

U.S. PATENT DOCUMENTS

| | | | |
|---|---|---|---|
| 5,031,089 A | * | 7/1991 | Liu et al. ............ 709/226 |
| 5,948,055 A | * | 9/1999 | Pulsipher et al. ........ 709/202 |
| 6,047,325 A | | 4/2000 | Jain et al. |
| 6,070,243 A | | 5/2000 | See et al. |
| 6,141,749 A | | 10/2000 | Coss et al. |
| 6,266,707 B1 | | 7/2001 | Boden et al. |
| 6,360,265 B1 | | 3/2002 | Falck et al. |
| 6,366,578 B1 | | 4/2002 | Johnson |
| 6,393,456 B1 | * | 5/2002 | Ambler et al. ........ 709/200 |
| 6,466,932 B1 | | 10/2002 | Dennis et al. |
| 6,470,332 B1 | * | 10/2002 | Weschler ............ 707/3 |
| 6,510,154 B1 | | 1/2003 | Mayes et al. |
| 6,510,509 B1 | | 1/2003 | Chopra et al. |
| 6,549,516 B1 | | 4/2003 | Alber |
| 6,684,335 B1 | | 1/2004 | Epstein, III et al. |
| 6,691,168 B1 | | 2/2004 | Bal et al. |
| 6,694,436 B1 | | 2/2004 | Audebert |
| 6,717,949 B1 | | 4/2004 | Boden et al. |
| 6,728,885 B1 | | 4/2004 | Taylor et al. |

FOREIGN PATENT DOCUMENTS

| | | |
|---|---|---|
| EP | 0 962 861 A2 | 12/1999 |
| EP | 1 063 815 | 12/2000 |

OTHER PUBLICATIONS

Webster's Seventh New Collegiate Dictionary, G.C. Merriam Co., Copyright 1971, pp. 438 and 767.

"Distributed Management of Future Global Multi–Service Networks", Smith et al., British Telecommunication Engineering, 13 (1994) Oct., pp. 221–226.

"HYBRID: Unifying Centralised and Distributed Network Management using Intelligent Agents", Somers, F., IEEE, 1996, pp. 34–43.

* cited by examiner

*Primary Examiner*—Albert W. Paladini
(74) *Attorney, Agent, or Firm*—Lee & Hayes, PLLC

(57) ABSTRACT

A system facilitates the design and implementation of large-scale applications, such as Internet Services and Websites, for distributed computer systems, such as server data centers, Internet data centers (IDCs), Web farms, and the like. The system has a modeling system and a deployment system. The modeling system permits developers to architect the hardware and software used to implement the applications in an abstract manner. The modeling system defines a set of components used to describe the functionality of an application. The model components are arranged and interconnected to form a scale-independent logical model of the application. Once a logical model is created, the deployment system uses the logical model to automatically deploy various computer/software resources to implement the application. The deployment system converts each of the model components into one or more instances that correspond to physical resources.

64 Claims, 9 Drawing Sheets

Module Table

| Instance ID | Model Component | Node ID | S/W Type | S/W ID | ID of Port(s) | Protocol |
|---|---|---|---|---|---|---|
| A | Front End | 123 | FE, Ver. 3.1 | K123 | A1, A2, A3 | HTTP, TCP |
| B | Front End | 332 | FE, Ver. 3.1 | K124 | B1, B2, B3 | HTTP, TCP |
| .. | .. | .. | .. | .. | .. | .. |
| ZA | Order Proc. | 14 | OP, Ver. 1.4 | 3B58 | ZA1, ZA2 | HTTP |
| ZB | Order Proc. | 854 | OP, Ver. 1.4 | 3B59 | ZB1, ZB2 | HTTP |

Port Table

| Port ID | Model Component | Node ID | Network Address | Instance ID | Protocol | Wire ID |
|---|---|---|---|---|---|---|
| A1 | FE Port | 123 | Port 80 | A | HTTP | W115 |
| .. | .. | .. | .. | .. | .. | .. |

Wire Table

| Wire ID | Model Component | Node ID | Port ID | Instance ID | Protocol |
|---|---|---|---|---|---|
| W115 | FE-to-OP Wire | 123 | A2 | A | SOAP |
|  |  | 14 | ZA1 | ZA |  |
| .. | .. | .. | .. | .. | .. |

Fig. 9

SYSTEM AND METHOD FOR DESIGNING A LOGICAL MODEL OF A DISTRIBUTED COMPUTER SYSTEM AND DEPLOYING PHYSICAL RESOURCES ACCORDING TO THE LOGICAL MODEL

TECHNICAL FIELD

This invention relates to distributed computer systems, such as Internet-based Services or Websites. More particularly, this invention pertains to a way to convert a logical, scale-independent model of an application for a distributed computer system to an actual physical configuration.

BACKGROUND

It is no secret that Internet usage has exploded over the past few years and continues to grow rapidly. People have become very comfortable with many services offered on the World Wide Web (or simply "Web"), such as electronic mail, online shopping, gathering news and information, listening to music, viewing video clips, looking for jobs, and so forth. To keep pace with the growing demand for Internet-based services, there has been tremendous growth in the computer systems dedicated to hosting Websites, providing backend services for those sites, and storing data associated with the sites.

One type of distributed computer system is an Internet data center (IDC), which is a specifically designed complex that houses many computers for hosting Internet-based services. IDCs, which also go by the names "Webfarms" and "server farms", typically house hundreds to thousands of computers in climate-controlled, physically secure buildings. These computers are interconnected to run one or more programs supporting one or more Internet services or Websites. IDCs provide reliable Internet access, reliable power supplies, and a secure operating environment.

FIG. 1 shows an Internet data center 100. It has many server computers 102 arranged in a specially constructed room. The computers are general-purpose computers, typically configured as servers. An Internet data center may be constructed to house a single site for a single entity (e.g., a data center for Yahoo! or MSN), or to accommodate multiple sites for multiple entities (e.g., an Exodus center that host sites for multiple companies).

The IDC 100 is illustrated with three entities that share the computer resources: entity A, entity B, and entity C. These entities represent various companies that want a presence on the Web. The IDC 100 has a pool of additional computers 104 that may be used by the entities at times of heavy traffic. For example, an entity engaged in online retailing may experience significantly more demand during the Christmas season. The additional computers give the IDC flexibility to meet this demand.

While there are often many computers, an Internet service or Website may only run a few programs. For instance, one Website may have 2000–3000 computers that run only 10–20 distinct software components. Computers may be added daily to provide scalability as the Website receives increasingly more visitors, but the underlying programs change less frequently. Rather, there are simply more computers running the same software in parallel to accommodate the increased volume of visitors.

Today, there is no conventional way to architect Internet Services in a way that abstracts the functionality of the Service from the underlying physical deployment. Little thought has gone into how to describe a complete Internet Service in any manner, let alone a scale-invariant manner. At best, Internet Service operators might draft a document that essentially shows each and every computer, software program, storage device, communication link, and operational relationship in the Website as of a specific time and date. The downside with such physical schematics is, of course, that the document is always out of date, must be updated as the Service grows in physical resources and hence, it is of limited usefulness as a management tool. Furthermore, while a human may understand such a document, it holds no meaning to a computer.

Moreover, managing the physical resources of the distributed computer system for an Internet Service is difficult today. Decisions such as when to add (or remove) computers to carry out portions of the Internet Service are made by human operators. Often times, these decisions are made based on the operators' experience in running the Internet Service. Unfortunately, with the rapid growth of services, there is a shortage of qualified operators who can make real-time decisions affecting the operation of a Website. Accordingly, it would be beneficial if some of the managerial aspects of running a Internet service could be automated.

SUMMARY

A system facilitates the design and implementation of large-scale distributed computer applications, such as Internet Services and Websites. The applications are implemented as software distributed over many interconnected computer nodes, such as server data centers, Internet data centers (IDCs), Web farms, and the like.

The system has a modeling system and a deployment system. The modeling system permits developers to architect the hardware and software used to implement the applications in an abstract manner. The modeling system defines a set of components used to describe the functionality of an application in a logical, scale-independent manner. In the described implementation, the modeling system defines several model components: a module, a port, and a wire. The model also admits an unlimited set of model extensions including, but not limited to stores, event sources, event sinks, and event wires.

The module is basic functional unit and represents a container of behavior that may be implemented by one or more computers ruining one or more software programs. For instance, in the context of a Website, one module might represent a front end that renders HTML pages, another module might represent a login database, and another module might represent a mailbox program. A port is a service access point for the module. All communications into and out of the module go through a port. A wire is the logical binding that defines an allowed communication route between two ports.

While the model consists of the three basic components described above (namely modules, ports, and wires), the model can be augmented with numerous extensions, specializations of the basic components. For example, a store is a basic unit of storage and a specialization of the module. A store represents a logical amount of storage, which may be implemented by any number of physical disks or other storage media. Like the module, the store represents behavior, in this case the ability to save and retrieve data. Also like the module, the store can communicate with other modules and stores through ports and wires. A store differs from a module in that it is labeled with additional attributes such as the amount of storage required, required access speed, or a minimum number of outstanding storage requests. The store extends the model by adding a specialized type of module with additional semantic information.

The model can be further augmented with ports extensions. For example, an event source and an event sink are used for discrete semantic messaging between modules and module extensions, such as stores. Event sinks are specialized ports in that they are communication access points between model components, but with additional semantics, namely the specific events.

The model can also be augmented with wires extensions. For example, an event wire is a logical connection between event sources and event sinks, and carries event messages used to inform modules and implement policy. While most wire extensions allow communication at run time, it is possible for some wire extensions to transfer data only at compile or initialization time.

The model components are arranged and interconnected to form a scale-independent model of the application. Each component specifies some functionality of the application.

Once a logical model is created, the deployment system uses the logical model to automatically deploy various computer/software resources to implement the application. The deployment system converts each of the model components into one or more instances that correspond to physical resources. As one example, the resources correspond to computer nodes of a distributed computer system that are loaded with specific types of software to implement the function represented by the model components. The deployment system initially installs the application and then dynamically and automatically modifies the resources used to implement the application in an ongoing basis as the operating parameters of the application change.

In one implementation, the deployment system includes a service running state to store the logical model and track instances of the model components as they are created (or destroyed). A resource manager tracks the computer nodes available for allocation and tracks the nodes as they are allocated to correlate the nodes with the instances. The deployment system further includes a loader to load software onto newly allocated computer nodes to implement the logical functions represented by the model components.

BRIEF DESCRIPTION OF THE DRAWINGS

FIG. 9 illustrates exemplary data records of an instance database used to store the real-world instances.

DETAILED DESCRIPTION

Figure 1:
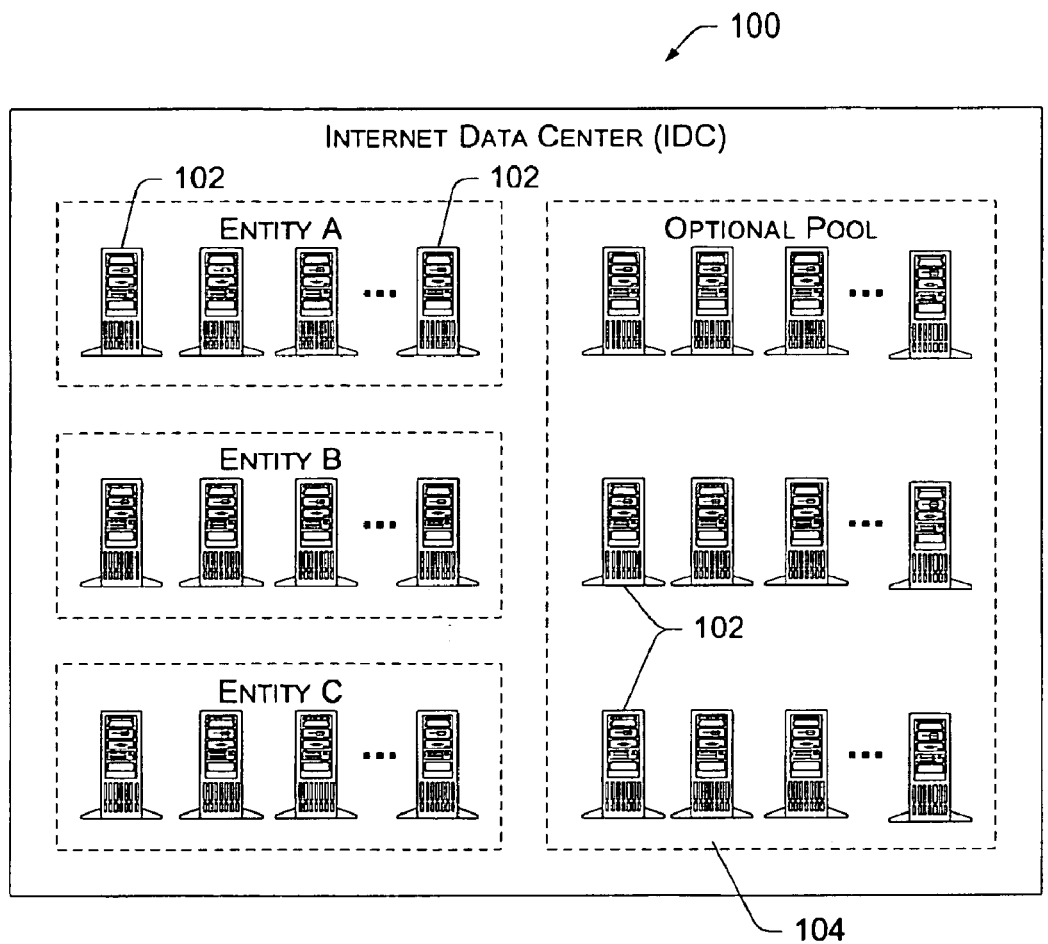
FIG. 1 illustrates a conventional Internet data center (IDC).

A design system for designing applications of distributed computer systems includes a modeling system and a deployment system. The modeling system permits developers of applications for distributed computer systems (e.g., server data centers, Internet data centers (IDCs), Web farms, and the like) to architect the hardware and software in an abstract manner. The modeling system defines a set of components used to describe the functionality of an application in a logical, scale-independent manner. An "application" within this context refers to an entire service hosted on the distributed computers. For instance, an Internet data center may host a Website for an online retailer, where the application entails the entire software and hardware configuration that implements the online retailer's Internet presence. The application might include, for example, a front end to handle client requests, an order processing system, a billing system, an inventory system, and a database system.

The model components are arranged and interconnected to form a scale-independent model of the application. Each component specifies some functionality of the application. The model can then be used to construct a scalable physical blueprint in terms of which machines run which pieces of software to form the application.

The deployment system uses the logical model to deploy various computer/software resources in real-time as the applications need them. The deployment system converts each of the model components into one or more instances that correspond to physical resources. The deployment system tracks the instances and all available resources. The deployment system decides when resources should be added (or removed) and monitors the current state of implementation. The deployment system installs the application and then dynamically and automatically modifies the resources used to implement the application in an ongoing basis as the operating parameters of the application change.

The design system is described in the context of Internet Services and Websites, such as might be deployed in Internet data centers, because modeling Internet Services represents one suitable use of the system. However, the design system may be implemented to model other large size and scalable applications for computer systems. Accordingly, the design system can be implemented in a wide variety of ways, including Internet-based implementations and non-Internet-based implementations.

Model Components and Schema

The modeling system defines several model components that form the building blocks of a logical, scale-independent application: a module, a port, and a wire. It also defines a set of model extensions including, but not limited to: a store, an event source, an event sink, and an event wire. In a design tool, the components are represented pictorially as graphical elements or symbols that may be arranged and interconnected to create scale-independent models of Website applications. The graphical elements have an associated schema that dictates how the functional operations being represented by the graphical elements are to be specified.

Figure 2:
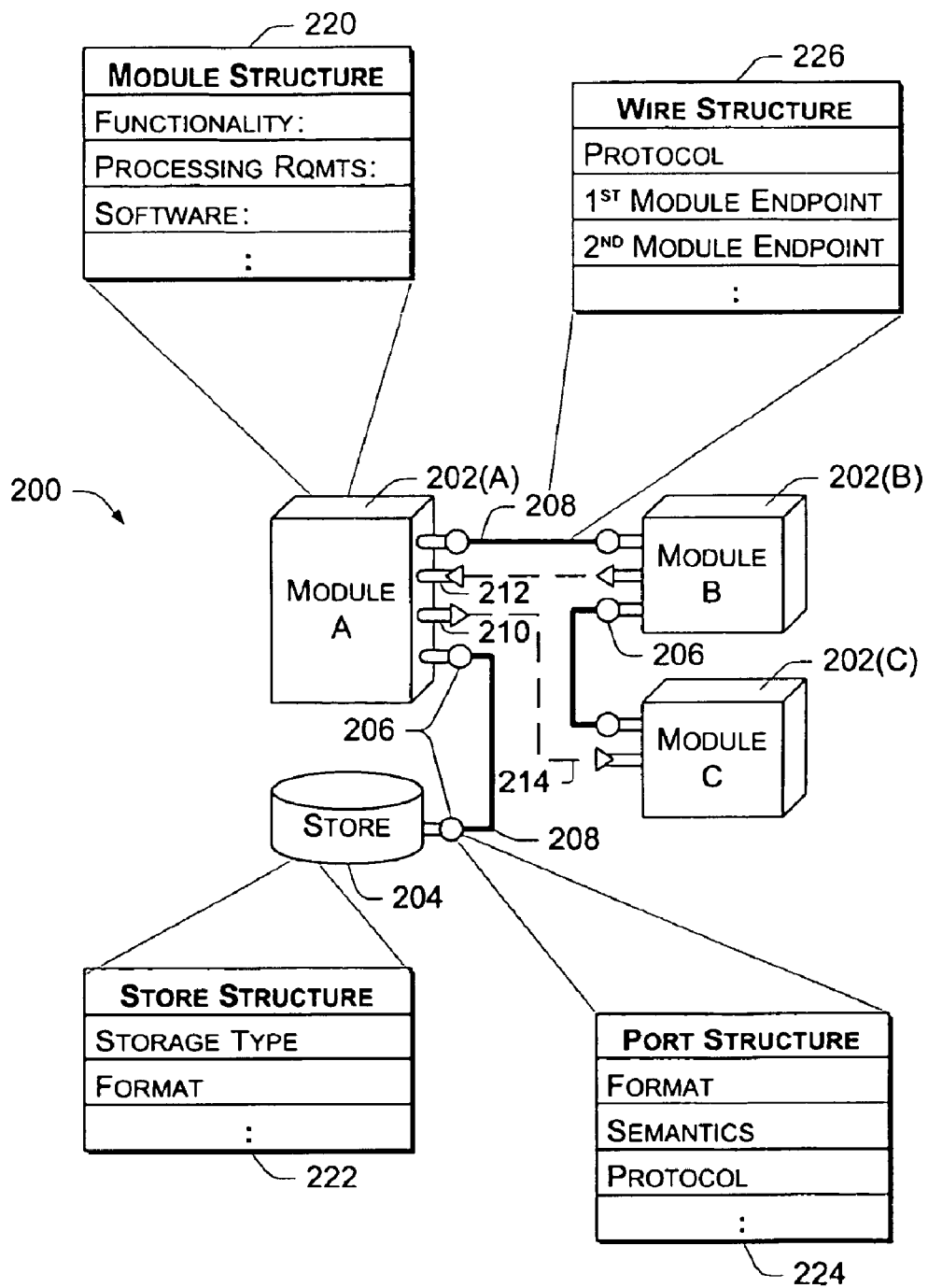
FIG. 2 illustrates a set of model components that form the building blocks for modeling an Internet Service, along with the associated schema.

FIG. 2 illustrates a set of model components 200 that form the building blocks of logical, scale-independent Internet Services. The components include a module, as represented by modules 202(A)–202(C), ports 206, wires 268, and extensions such as a store 204, event sources 210, event sinks 212, and event wires 214. The components 200 are arranged in a no particular manner other than to foster discussion of their individual traits.

A module 202 represents a basic unit of functionality for the Internet Service. It is a logical entity that represents some portion of the application as might be deployed at the IDC, but it does not necessarily have a physical manifestation. The module often corresponds to a software program that handles a logical set of tasks for the Service. For instance, one module might represent a front end for a Website, another module might represent a login database, and another module might represent an electronic mail program.

Each module 202 is a container of behavior. A simple module is indivisible and has associated a unique identifier. Modules can be nested into a hierarchy of modules to form more complex behaviors. In a module hierarchy, the leaf modules are simple modules, and the non-leaf modules are compound modules.

Each module 202 defines a unit of scaling. While one module logically represents a functional operation of the Service, the module may be deployed to any number of computers when actually implemented. In this way, the module is scale-independent, allowing the number of underlying computers used to implement the module to change over time. When converted to a physical implementation, "module instances" are created from the modules. The module instances are assigned a unique identifier and maintain ancestral data regarding which module created them. The module instances of simple modules are often called "engines", which are software programs that run on an individual computer.

Extensions to the model are additional components that specialize the role, behavior, and possibly graphical representation of the base components. Exemplary extensions include, but are not limited to, store 204, event source 210, event sink 212, and event wire 214.

A store 204 is the most basic unit of storage. It represents a logical storage partition, which may be implemented by any number of physical disks or other storage media.

A port 206 is a service access point (SAP) for a module 202 or store 204. All service-related communications into and out of a module go through a port 206. Each port 206 has a "type", which is a set of attributes describing format, semantics, protocol, and so forth. At runtime, the port represents a set of physical ports associated with the instantiated engines of the modules. Note that a given module might have any number of ports representing different services or functionality provided by the module.

A wire 208 is the logical binding that defines an allowable communication route between two ports 206. Each wire 208 can be type-checked (i.e., with respect to protocols, roles) and defines protocol configuration constraints (e.g., HTTP requires TCP, TCP requires IP, etc.).

Event sources 210 and event sinks 212 are used for discrete semantic messaging between modules and module extensions, such as stores. An event wire 214 is a logical connection between sources and sinks, and carries event messages used to inform modules or module extensions and implement policy (e.g., scaling, fail-over, monitoring, application processes, etc.).

The event sources 210 and event sinks 212, together with the ports 206, collectively form interfaces for communications to and from the modules 202 and module extensions, such as stores 204. The event sources and sinks may be implemented as ports that are configured for message handling.

The model components 200 are depicted as graphical icons or symbols that may be selected and interconnected using a modeling system (described below in more detail). In the illustrated example, the modules 202 are depicted as blocks, the store 204 is depicted as a disk storage icon, and the ports 206 are depicted as spherical knobs projecting from the modules or module extensions, such as stores. Additionally, the wires 208 are depicted as bold lines, the event sources 210 are depicted as triangles pointing away from the module or module extension, the event sinks 212 are depicted as triangles pointing toward the module or module extension, and the event wire 214 is depicted as a dashed line.

The graphical icons have an associated schema that dictates how the functional operations being represented by the icons are to be specified. For instance, a module icon may have a predefined schema that specifies the hardware and software resources used to implement the functionality represented by the module. Thus, a module for a database function might have characteristics pertaining to the kind of database (e.g., relational), the data structure (e.g., tables, relationships), software (e.g., SQL), software version, and so forth.

FIG. 2 also illustrates the schema underlying the graphical elements as exemplary data structures associated with the model components. Module 202(A) has an associated structure 220 that contains various characteristics for the module, such as functionality, processing requirements, software, and so forth. Modules 202(B) and 202(C) have similar structures (not shown). Model extensions also have associated structures. The store 204 has a corresponding structure 222 that defines the requirements for storage. The store schema structure 222 might include, for example, the kind of storage (e.g., disk), the storage format, and so on.

Each port 206 has a schema structure, as represented by structure 224, which dictates the port's type. Each wire 208 is also associated with a schema structure, such as structure 226, which outlines the protocols implemented by the connection. Similar schema structures may also be provide for event sources event sinks, and event wires.

Using the model components, a developer can logically describe and configure scale-independent Internet Service prior to physically laying them out in Internet data centers. The developer drafts a model using a user interface to select and interconnect the model components. Once constructed, the modeling software generates the Internet Service based on the depicted model and the underlying schema. The Service may subsequently be converted into a physical blueprint that details the computers and software needed to implement the Service for a specified number of clients.

The scale-invariant nature of the modeling system allows Internet Service developers to focus only on designing software for a specific functional task (e.g., front end, login database, email program, etc.). All external communications can then be expressed in terms of transmitting to and receiving from one or more associated ports. In this manner, the Service developers need not worry about how many machines will be used to run the module, or how other modules of the scale-independent Internet Service are being configured.

Exemplary Module and Application

Figure 3:
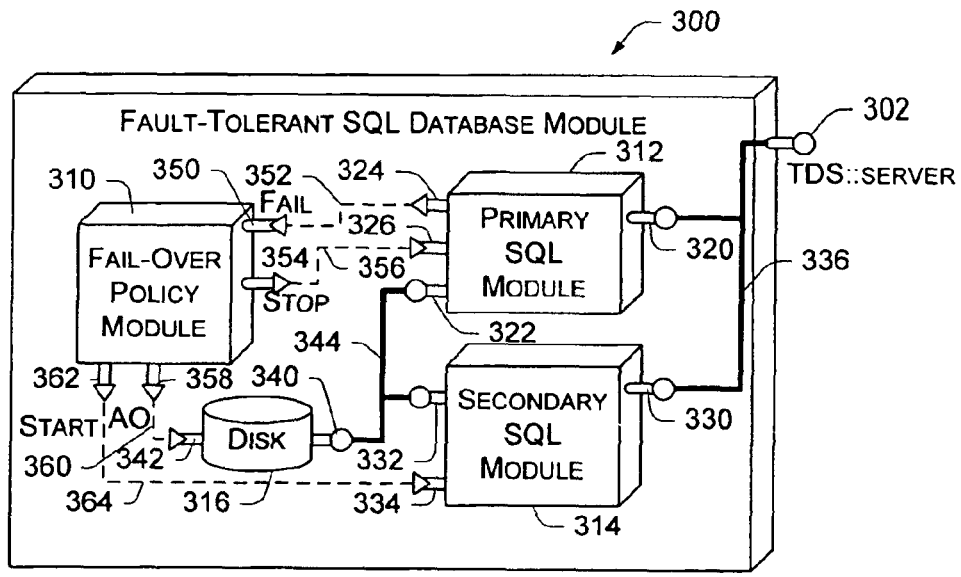
FIG. 3 illustrates a database application for an Internet Service that is modeled in terms of the components.

FIG. 3 shows a fault-tolerant SQL (structure query language) database module 300 to demonstrate how the model components may be organized and connected to represent a portion of an application. In this example, the database module 300 represents a SQL database that may be used independently or as a component in a larger application. The SQL database module 300 has a module interface composed of a single port 302 that implements the TDS (Tabular Data Stream) protocol.

The SQL database module 300 is a compound module made up of three simple modules: a fail-over policy module 310, a primary SQL module 312, and a secondary SQL module 314. The primary and secondary SQL modules represent dual programs that operate in parallel so that, in the event that the primary module 312 crashes, the secondary module 314 can assume the role without loss of service. The database module 300 also has a data store 316 that represents the memory storage for the SQL database module.

The primary SQL module 312 has a module interface that includes a first port 320 for communicating with the compound module port 302 and a second port 322 for communicating with the store 316. The primary SQL module 312 also has an event source 324 and an event sink 326 for handling event messages from the fail-over policy module 310. Similarly, the secondary SQL module 314 has a module interface with a first port 330 for communicating with the compound module port 302, a second port 332 for communicating with the store 316, and an event sink 334 for receiving events from the fail-over policy module 310. A wire 336 interconnects the external compound module port 302 with the ports 320 and 330 of the primary and secondary SQL modules, respectively.

The store 316 has a port 340 to communicate with the primary 312 and secondary 314 SQL modules and an event sink 342 to receive event messages from the fail-over policy module 310. A wire 344 interconnects the store port 340 with the ports 322 and 332 of the primary and secondary SQL modules, respectively.

The fail-over policy module 310 has a module interface that includes three event sources and one event sink. An event sink 350 receives a "fail" event from the event source 324 of the primary SQL module 312 via an event wire 352 when the primary SQL module experiences some failure. In response to receiving a "fail" event, the fail-over policy module 310 concurrently issues a first event to stop the failed primary module 312, another event to assign the secondary module 314 as the new owner of the store 316, and a third event to start the secondary module 314. The "stop" event is issued via an event source 354 over an event wire 356 to the event sink 326 of the primary SQL module 312. The "stop" event directs the primary SQL module 312 to halt operation.

The fail-over policy module 310 issues an "assign owner" (AO) event from an event source 358, over the event wire 360 to the event sink 342 of the store 316. The assign owner event directs the storage mechanisms to switch to allowing access by the secondary SQL module 314, rather than the primary SQL module 312. The fail-over policy module 310 also issues a "start" event from event source 362 over event wire 364 to the event sink 334 of the secondary module 314. The start event directs the secondary SQL module to start operation in place of the primary SQL module.

The SQL database module 300 illustrates how the base model components and exemplary model extensions—modules, ports, wires, stores, event sources, event sinks, and event wires—may be arranged and interconnected to form a complex module. The developer specifies the characteristics associated with each component according to the prescribed schema. The complex module may in turn be added to other simple or complex modules to form other complex modules. Eventually, the largest complex module becomes the Internet Service, which may then be used to form a blueprint for deploying to the data center.

Figure 4:
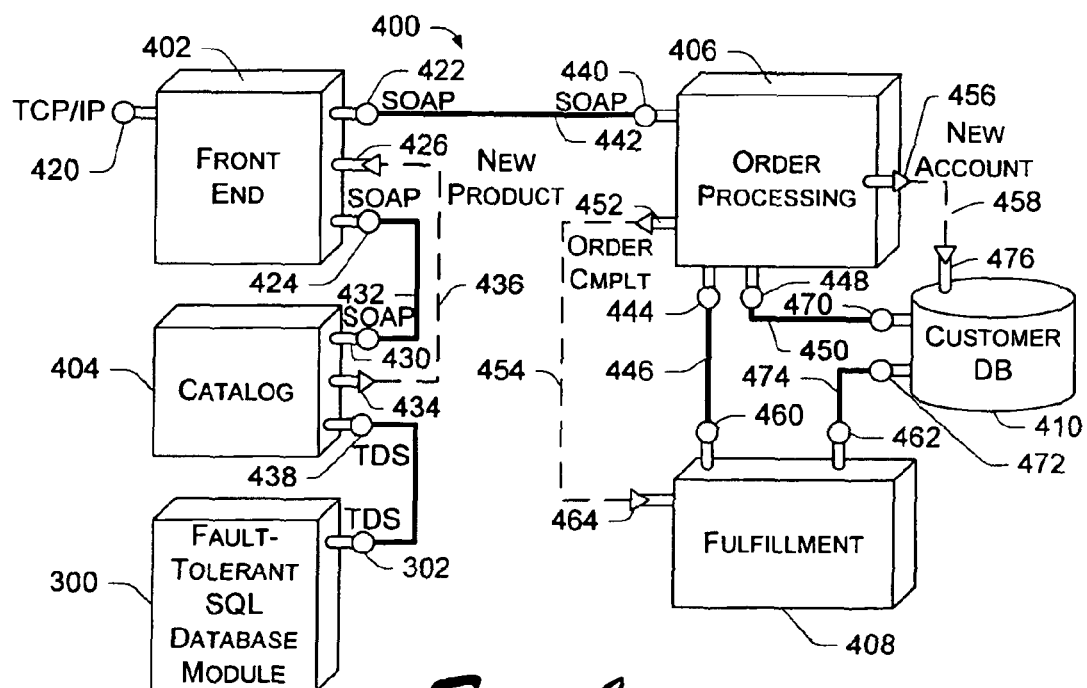
FIG. 4 illustrates an Internet-based email Internet Service.

FIG. 4 shows a simplified application 400 for an online retailer. The application 400 includes a front end module 402, a catalog module 404, an order processing module 406, and a fulfillment module 408. The application 400 also includes a customer database 410 and the fault-tolerant SQL database module 300. Notice that the SQL database module 300 is the same as that shown in FIG. 3 to illustrate how complex modules can be nested into even greater complex modules to form an application.

The front end module 402 handles requests from clients who wish to shop with the online retailer. The front end module 402 has a port 420 that accommodates communications with external clients using the TCP/IP protocol over the Internet. The front end module 402 also has an order port 422 to define a communication exchange with the order processing module 406 and a catalog port 424 for communication flow to the catalog module 404. The ports 422 and 424 may be configured according to any of a variety of types, which support any of a number of protocols including SOAP, TCP, or UDP. An event sink 426 is also provided to receive a "new product" message from the catalog module 404 when a new product has been added to the catalog.

The catalog module 404 provides catalog information that may be served by the front end to the requesting clients. The catalog module 404 has a front end port 430 connected via a wire 432 to the catalog port 424 of the front end module 402. The front end port 430 has a type that matches the catalog port 424. The catalog module 404 also has an event source 434 for communicating the "new product" messages over wire 436 to the event sink 426 of the front end module 402.

A SQL port 438 interfaces the catalog module 404 with the SQL database module 300. The SQL port 438 has a type that utilizes the TDS protocol for the communication exchange with the external port 302 of the SQL database 300.

The order processing module 406 has a front end port 440 to define a communication interface with the front end module 402 via a wire 442. The order processing module 406 also has a fulfillment port 444 to facilitate communication with the fulfillment module 408 over wire 446 and a database port 448 to facilitate communication with the customer database 410 via wire 450.

An event source 452 is provided at the order processing module 406 to pass "order complete" events to the fulfillment module 408 via wire 454. These events inform the fulfillment module 408 that an order is complete and ready to be filled. A second event source 456 passes "new account" events to the customer database 410 via wire 458 whenever a new customer orders a product.

The fulfillment module 408 has an order port 460 to provide access to the wire 446 to the order processing module 406 and a database port 462 to interface with the customer database 410. The fulfillment module 408 also has an event sink 464 to receive the "order complete" events from the order processing module 406.

The customer database 410 has an order port 470 to provide access to wire 450 and a fulfillment port 472 to facilitate communication with the fulfillment module 408 via wire 474. The customer database 410 further has an event sink 476 to receive the "new account" events from the order processing module 406.

The modeling approach illustrated in FIGS. 3 and 4 is tremendously beneficial because it allows developers and IDC operators to view the entire Internet Service in terms of functional pieces independent of deployment scale. The online retailer Internet Service 400, for example, requires a front end unit, a catalog unit, an order processing unit, and a fulfillment unit regardless of whether the retailer is handling 100 hits a day or 10 million hits per day.

The scale-independent nature frees the developer to focus on his/her little piece of the Service. For instance, a developer assigned the task of building the front end module 402 need only be concerned with writing software code to facilitate response/reply exchanges. Any communication to and from the module is defined in terms of order-related data being passed to the order processing module 406 via the order port 422 and product data being received from the catalog module 404 via the catalog port 424. The developer defines the data flow to and from the order port 422 and the catalog port 424 according to their respective associated protocol types.

The Internet Service 400 can then be used to construct a computer system that hosts the online retailer. Initially, the online retailer may not receive very much traffic, especially if launched away from the Christmas season. So, perhaps the front end module 402 deploys initially to only a few computers to handle the light traffic from the Internet. But, suppose that over time the site becomes more popular and the Christmas season is fast approaching. In this situation, the online retailer may authorize the IDC operator to add many more computers for the front end tasks. These computers are equipped with software and configured to accept HTTP requests for product information and to serve Web pages containing the product information. The computers are added (or removed) as needed, without altering the basic description of the Internet Service 400.

Computer-Based Modeling System and Method

Figure 5:
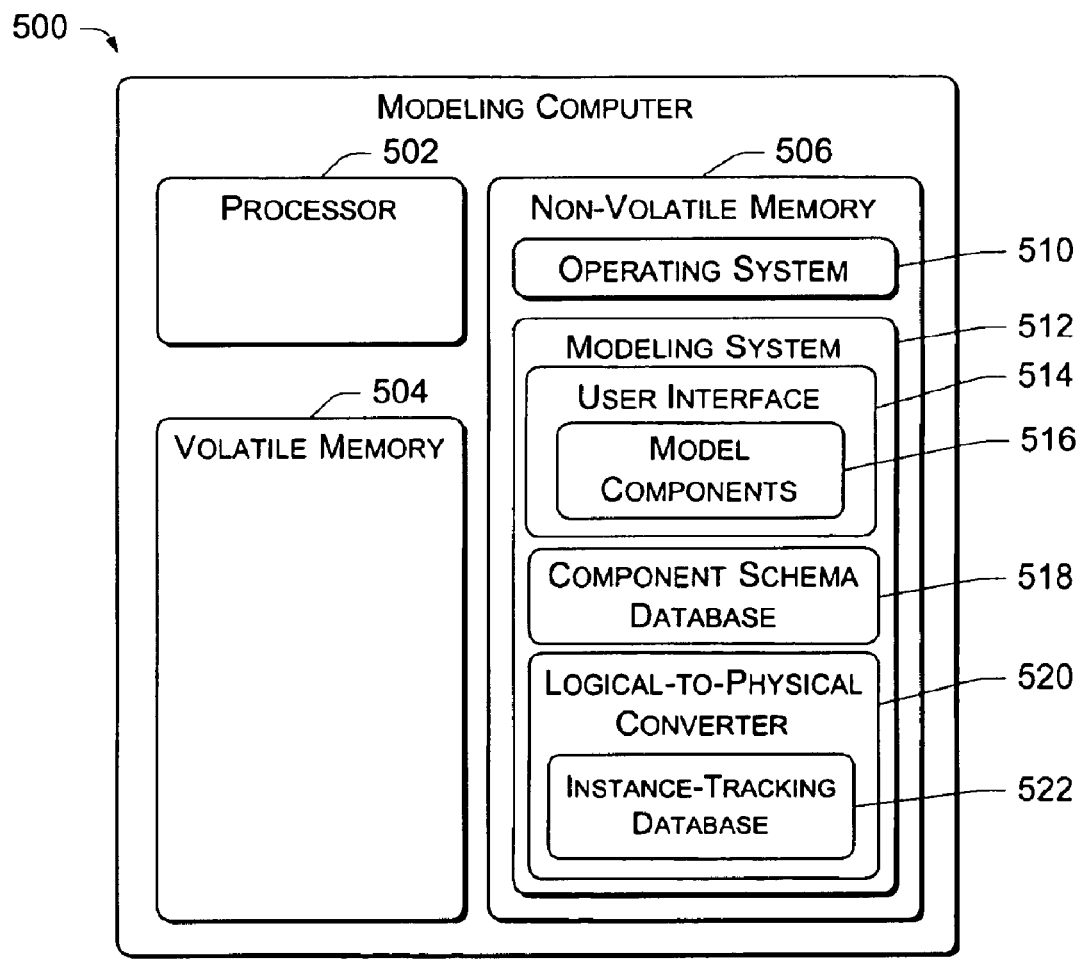
FIG. 5 is a block diagram of a computer that may be used to implement the modeling software for modeling an Internet Service.

FIG. 5 shows an exemplary computer system 500 that implements modeling software used to design Internet Services. The modeling computer may be implemented as one of the nodes in a Internet Service, or as a separate computer not included as one of the nodes. The modeling computer has a processor 502, volatile memory 504 (e.g., RAM), and non-volatile memory 506 (e.g., ROM, Flash, hard disk, optical, RAID memory, etc.). The modeling computer 500 runs an operating system 510 and modeling system 512.

For purposes of illustration, operating system 510 and modeling system 512 are illustrated as discrete blocks stored in the non-volatile memory 506, although it is recognized that such programs and components reside at various times in different storage components of the computer 500 and are executed by the processor 502. Generally, these software components are stored in non-volatile memory 506 and from there, are loaded at least partially into the volatile main memory 504 for execution on the processor 502.

The modeling system 512 includes a user interface 514 (e.g., a graphical UI) that presents the pictorial icons of the model components 516 (e.g., modules, ports, sources, sinks, etc.), a component schema database 518, a logical-to-physical converter 520, and an instance-tracking database 522. The modeling system 512 allows a developer to design an Internet Service by defining modules, ports, wires, and event message schemes. The user interface 514 presents symbols of the components 516, such as the symbols shown in FIGS. 2–4, and permits the developer to arrange and interconnect them. The UI 514 may even support conventional UI techniques as drag-and-drop operations.

The symbols depicted on the screen represent an underlying schema 518 that is used to define the model. For instance, a block-like module symbol is associated with the characteristics of the functionality that the module is to represent in the Internet Service. Thus, the developer may define a database module that has characteristics pertaining to the kind of database (e.g., relational), the data structure (e.g., tables, relationships), software (e.g., SQL), software version, and so forth. Accordingly, by drafting the model on the UI, the developer is architecting the entire schema that will be used to design the scale-independent Internet Service.

Once the Internet Service is created, the logical-to-physical converter 520 converts the Service to a physical blueprint that details the number of computers, software components, physical ports, and so forth. The converter takes various parameters—such as how many site visitors are expected, memory requirements, bandwidth requirements, processing capabilities, and the like—and scales the Internet Service according to the schema 518 created by the developer. The converter 520 specifies the number of computers needed to implement each module, the number of disks to accommodate the stores, and the types of communications protocols among the modules and stores. The identity of every component instance is recorded in an instance-tracking database 522. Instances in the instance-tracking database 522 include those for modules, port, wires, and instances of model extensions such as stores, event ports, and event wires.

In one embodiment, the developer writes management policy, which issues commands on the schema 518 to create new instances of modules, port, and wires to deploy the Internet Service. Developers may choose to write management policy instead of using fully automatic logical-to-physical converter 520 when they want finer control over the growth and management of the Internet Service. The management code issues commands using the namespace defined by the schema 518, but the commands operate on individual module, port, and wire instances. The commands are still dispatched through the converter 520, which allocates nodes to the management policy. Whether operating automatically or driven by management policy code, the converter 520 records in the instance-tracking database 522 the individual instances of modules, port, and wires.

In this manner, the modeling system changes the development effort from a node-centric approach for architecting Internet Services to an application-centric approach. Within conventional node-centric methodology, the focus was on the computers and how they were laid out. The Internet Service was then loaded onto the nodes in an ad hoc manner. With the new application-centric approach, the focus is initially on the Internet Service itself. The physical nodes used to implement the Internet Service are derived in terms of the Service schema once it is specified. The instance-tracking database 522 gives both developers and operators information about how many instances of each module are running at any time and how the modules are connected using port instances and wires instances within the Service schema.

Figure 6:
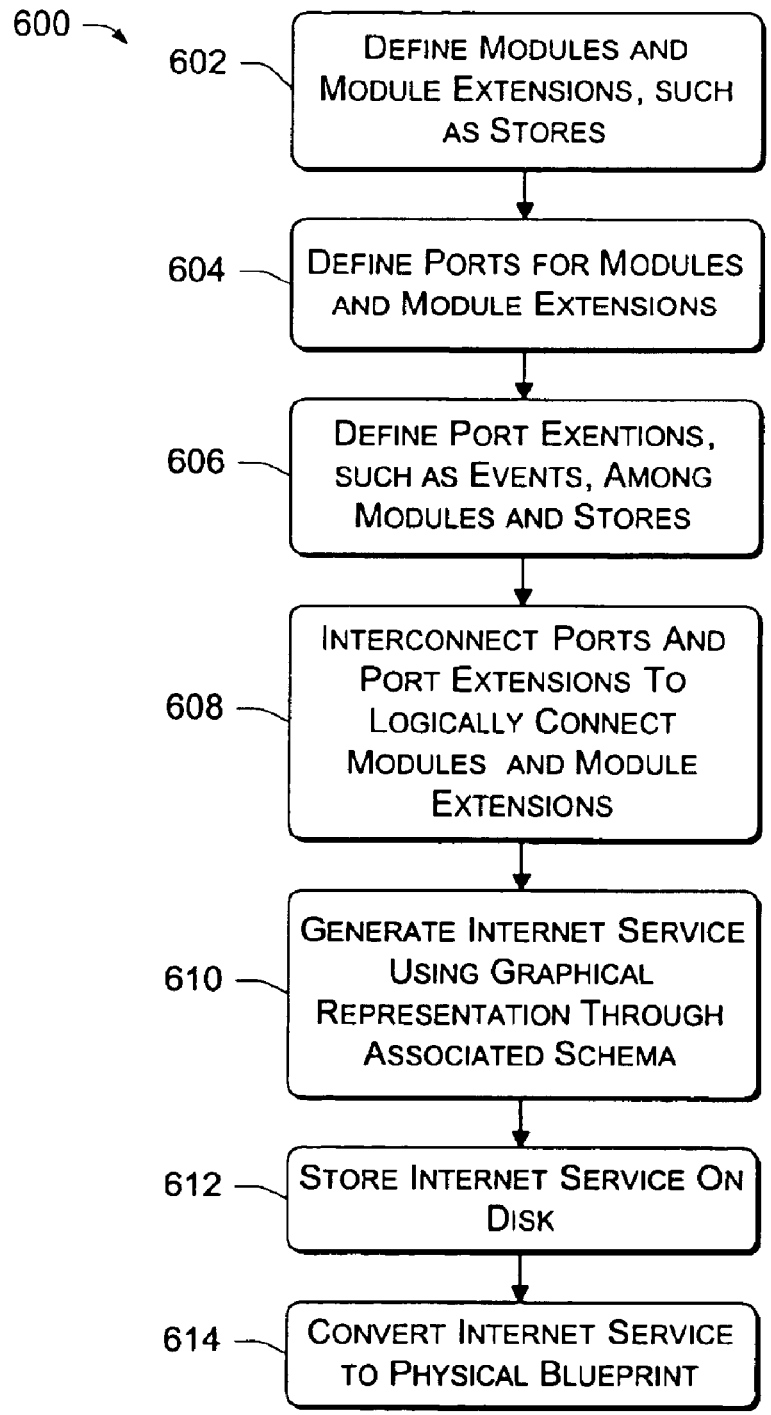
FIG. 6 is a flow diagram of a process for modeling an Internet Service.

FIG. 6 shows a method for modeling a scale-independent Internet Service. The method 600 may be implemented, for example, by the modeling system 512 executing on the modeling computer 500. In such an implementation, the method is implemented in software that, when executed on computer 500, performs the operations illustrated as blocks in FIG. 6.

At block 602, the modeling system 512 allows the developer to define the modules and extensions, such as stores, that form the functional elements of the Internet Service. The UI 514 enables the developer to create modules and extensions, such as stores, and to define their characteristics as prescribed by a predetermined schema. This entry process begins to construct the logical building blocks of the Service.

At block 604, the modeling system 512 enables the developer to define the ports for the modules and module extensions, such as stores. The developer selects the type of ports. The modeling system ensures compatibility of ports that are connected to one another. At block 606, the developer also defines other extensions, such as events that may be passed among modules and module extensions, such as stores. For example, the developer creates event sources and event sinks to accommodate the various events. At block 608, the developer uses the modeling system 512 to interconnect the ports with wires and the port extensions, such as event sources/sinks with wire extensions, such as event wires. By joining the various modules and module extensions, such as stores, the developer effectively forms a logical representation of the Internet Service.

At block 610, the modeling system 512 generates an Internet Service using the graphical representation constructed by the developer through its associated schema. The modeling system 512 generates the logical specifications associated with the graphical model, including the characteristics of the modules and module extensions, such as stores, as well as the types of the ports and port extensions, such as event sources/sinks. The Internet Service provides a complete logical representation of the Service that will eventually be implemented at the Internet data center. The Internet Service description may be stored on disk or some other form of computer-readable medium (block 612).

At block 614, the modeling system 512 converts the Internet Service description to a physical blueprint that specifies the computers, the software run by each of the computers, and the interconnections among the computers. This physical blueprint may be used by the operator to install and manage the Internet Service.

Computer-Based Deployment System and Method

Once a logical model is created, an automatic computer-based deployment system uses the logical model to deploy various computer/software resources to implement the Internet Service. The deployment system converts each of the model components into one or more instances that correspond to physical resources, such as nodes of a distributed computer system that are loaded with specific types of software to implement the function represented by the model components. The deployment system initially installs an Internet Service on the physical resources according to the logical model. It then dynamically and automatically modifies the resources used to implement the Internet Service on an ongoing basis as the operating parameters of the application change.

In one embodiment, the deployment system installs an Internet Service under the direction of management policy code authored by the Service developers. When operated under the direction of management code, the deployment system creates instances as instructed by the management code. The management code assumes partial or complete responsibility for monitoring the Service and determining when instances should be created and destroyed.

Figure 7:
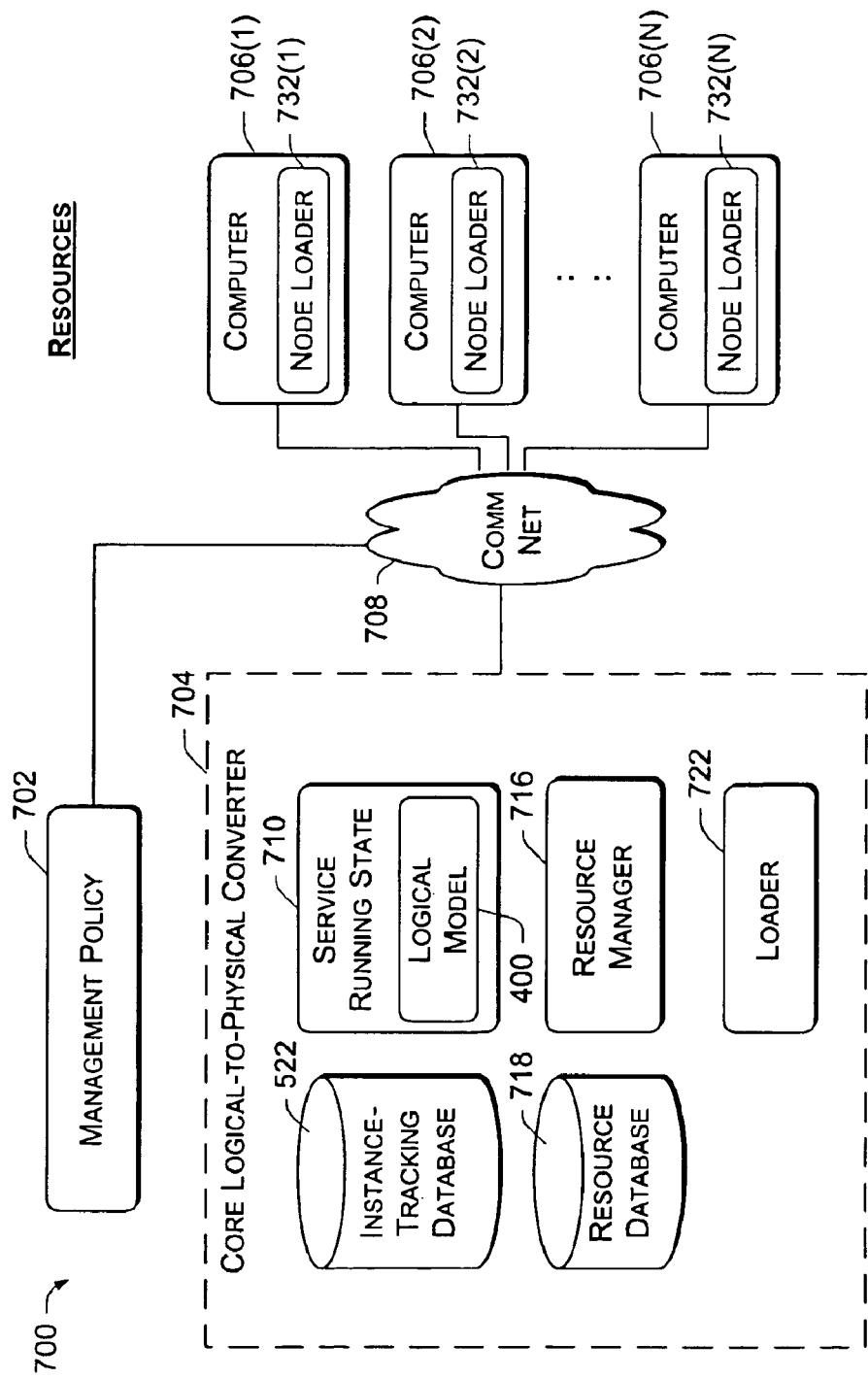
FIG. 7 is a block diagram of a deployment system that converts a logical model to a fully functioning physical implementation

FIG. 7 shows a deployment system 700 that converts the logical model to a fully functioning physical implementation. The deployment system 700 includes management policy 702, a core logical-to-physical converter 704, and hardware/software resources 706 that are all interconnected via a wireless and/or wire-based communication network 708 (e.g., a LAN, a WAN, intranet, Internet, combinations thereof, etc.). In this example, the hardware/software resources are illustrated as computer nodes of a distributed computer system, as represented by computers 706(1), 706(2), . . . , 706(N). The management policy 702 and core converter 704 may be implemented on one or more computers, which may or may not be part of the nodes in the distributed computer system.

For purposes of discussion, the deployment system 700 is described in the context of an Internet Service that is executed at an Internet data center having an abundance of generic computer nodes. The nodes can be allocated to one or more Internet Services from a reserve pool of nodes, as illustrated in FIG. 1.

The management policy 702 implements one or more policies devised by the developer or operator of the Internet Service. The policies specify when instances derived from the logical model should be created, manipulated, and destroyed. The management policy monitors various events generated by the nodes and implements policy decisions regarding how to handle the events. By specifying when and which instances should be created (or destroyed), the management policy 702 effectively dictates when hardware/software resources 706 should be added (or removed) to support the changing demands of the Internet Service.

The core converter 704 implements the policy decisions made by the management policy 702. The runtime converter 704 has a service running state 710 that tracks all instances of the model components currently in existence. That is, the service running state 710 tracks the elements in the physical world with respect to the logical model. The service running state 710 maintains a copy of the logical model, such as online retailing model 400 of FIG. 4. The logical model is created by the modeling system described above with respect to FIGS. 5 and 6. The current instances are maintained in the instance-tracking database 522. The records in instance-tracking database 522 include such information as identity of the instance, the name of the logical component from which it is derived, the node on which it is running, the network addresses representing the ports of the modules and module extensions, such as stores, type of software loaded on the node, various protocols supported by the instance, and so forth. The instance-tracking database 522 tracks not only module instances, but also port instances, wire instances, and can also track instances of extensions such as stores, event ports, and event wires.

The instances are derived from the logical model. The management policy 702 articulates the number of instances of each model component used to implement the Internet Service at any given time. For example, suppose the Internet Service requires one hundred computers to effectively implement a front end that handles site traffic at 99.9% efficiency with each computer running at 70% utilization. The management policy 702 might further specify that more computers should be added if some policy threshold is met (e.g., efficiency rating drops below some threshold or computer utilization rises above some threshold) or removed if another threshold is met.

A resource manager 716 tracks all of the physical resources available to the Internet Service. These resources include computer nodes, storage, software, and so forth. Records identifying all of the resources are kept in the resource database 718. For instance, there might be one record for each computer node, storage device, and software module in the Internet data center. The records contain such information as the identity of the allocated nodes, computing characteristics and capabilities, the application(s) to which they are allocated, the date and time of allocation, and so forth.

The resource manager 716 allocates the resources as needed or requested by the Internet Service according to the policy implemented by the policy manager 702. The allocation depends upon the availability of resources at the time of request. The resource manager 716 may also recover resources that are no longer needed by the Internet Service and return the resources to the pool of available resources.

Upon allocation (or recovery) of a resource, the resource manager 716 posts a record to the resource database 718 reflecting which resource is allocated to (or recovered from) which Internet Service. As an example, when an Internet Service desires more nodes for the front end tasks, the resource manager 716 allocates one or more free nodes from the pool of resources to the Internet service.

The core logical-to-physical converter 704 manages the creation of new instances in the physical world from the model components specified in the logical model 400 through a loader 722. A loader 722 carries out the configuration of newly allocated resources to the functions dictated by the new instances. In this manner, when another instance of a component is desired, the management policy 702 communicates with the resource manager 716 to allocate a node from the resource pool and with the loader 722 to load the appropriate software programs onto the node.

The node loader 732 performs the actual loading tasks specified by the loader 722 in the core converter 704. It is the local code on an otherwise generic node to which the runtime loader 722 may communicate when configuring the node.

Figure 8:
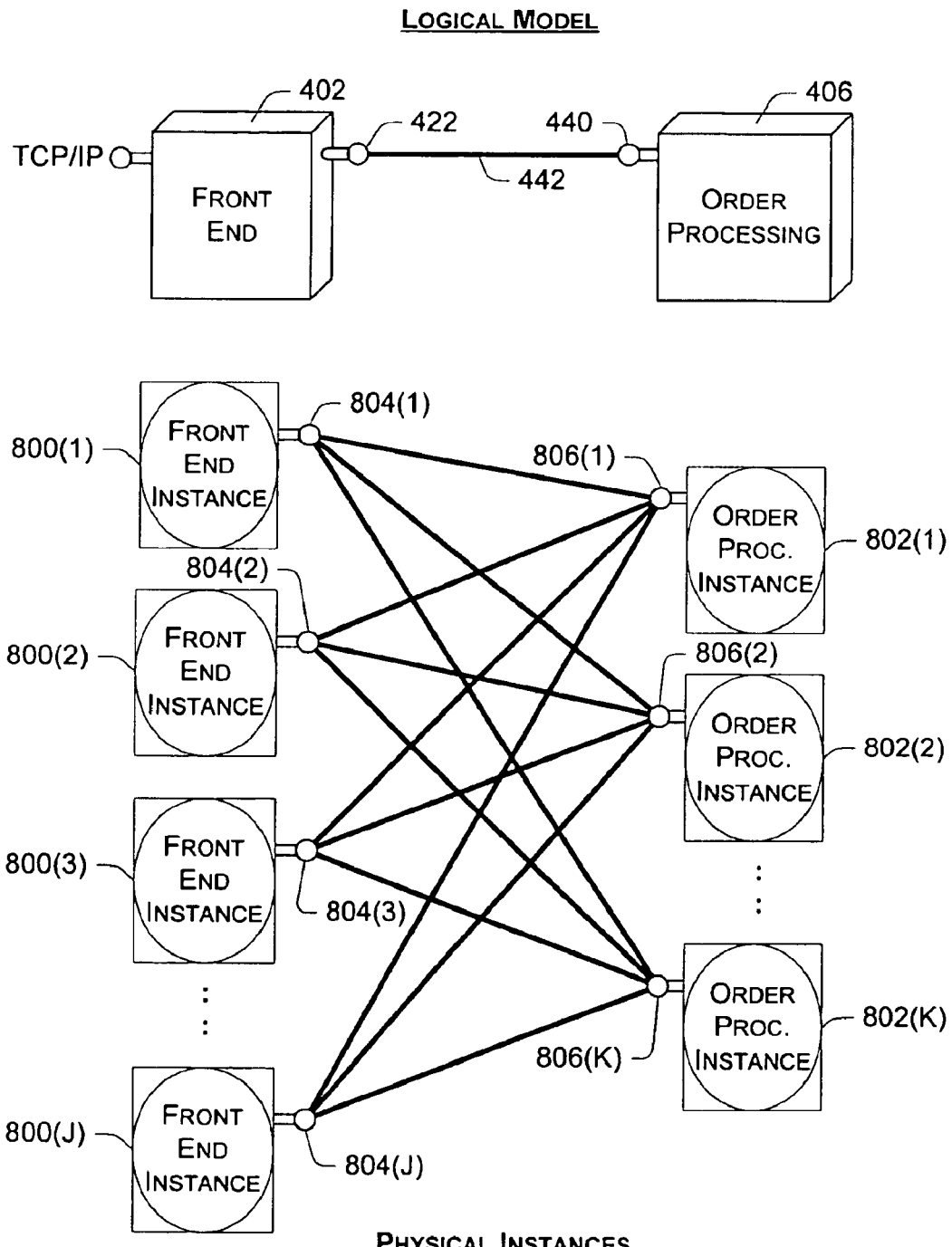
FIG. 8 illustrates a translation of the logical model into real-world instances.

FIG. 8 shows an example of a portion of the logical model 400 of FIG. 4 being converted into actual instances. To illustrate the conversion, the front end module 402 and the order processing module 406 are extracted from the online retailer service application 400 (FIG. 4). A wire 442 interconnects the two modules by logically coupling the ports 422 and 440.

The front end module 402 in the logical model translates to one or more computer nodes in the physical world that runs software for handling client queries. These physical instances are represented diagrammatically by the rectangles with ovals. Here, based on a policy, the front end module 402 is converted into multiple front end instances 800(1), 800(2), 800(3), . . . , 800(J), which each corresponds in one-to-one fashion with a computer node loaded with software used to implement the front end of the service. The order processing module 406 translates to one or more computer nodes that run a program for processing client orders. In FIG. 8, the order processing module 406 is converted into plural order processing instances 802(1), 802(2), . . . , 802(K).

The ports 422 and 440 represent network ports with protocols and roles within protocols in the logical world. They translate to the physical world as a set of network addresses used to communicate with the software at the respective modules. For instance, the physical translation of a logical port 422 might be IP Port 804(n), using HTTP (hypertext transport protocol). In FIG. 8, one logical port in the logical model is converted to a port address for each instance of the module. Logical port 422 converts into physical address ports 804(1)–804(J) and logical port 440 converts into physical ports 806(1)–806(K).

The wire 442 represents a set of ports with allowable communication connections. It translates to a physical mesh of all possible communication wires between the instances of each port. The maximum number of physical lines created from one wire 442 is determined as the cross product of the number of instances of each port. In FIG. 8, the wire 442 can convert to a physical connection a between every port instance 804(1)–804(J) of the front end module 402 and every port instance 806(1)–806(K) of the order processing module 406. The number of actual physical connections created from the wire 442 is determined by the management policy 702.

FIG. 9 illustrates exemplary records 900 in the instance-tracking database 522 that tracks the instances derived from the logical model 400. In this example, the database is a relational database that stores records in tables, and the records may be linked to one another via relationships. Here, there are three tables: a module table 902, a port table 904, and a wire table 906. Each table holds one record for a corresponding instance of the logical model. Each record has a number of fields relating to the type of information that is being tracked for each instance.

The module table 902 tracks instances of modules in the logical model. There is one record for each module instance. Thus, with respect to the front end module of FIG. 8, there are "J" records in the module table 902 corresponding to the "J" front end instances 800(1)–800(J). Each record in the module table 902 contains an instance ID to identify the individual instance, an identity of the module component from which the instance is derived, a node ID to identify the computer node to which the instance is associated, the type of software loaded on the node to implement the module functionality, a software ID, an identity of the various ports to the modules, and various protocols supported by the module instance. It is noted that other implementations may include additional fields or fewer fields than those illustrated.

The port table 904 tracks instances of the port in the logical model, such as ports 422 and 440 in FIG. 8. A record from this table includes such information as the port ID, the model component identity, a node ID, the network address represented by the port, the instance ID of the corresponding instance, the protocol used by the port, and an ID of the wire to which the port is connected. Again, more or fewer fields may be used in other implementations.

The wire table 906 tracks instances of the wires in the logical model, such as wire 442 in FIG. 8. A record in the wire table includes a wire ID, a model component identity, the protocol supported by the wire, and information to identify each of the ports on the wire, such as a node ID, a port ID, and an instance ID.

Notice that the three tables can be correlated with one another via various relationships. For example, the module table 902 and the port table 904 are related by various data fields, such as the port ID field and the instance ID field. The wire table 906 correlates with the port table 904 via wire ID and port ID and with the module table 902 via instance ID. Notice also that the tables have a node ID field that provides a reference into the resource database by identifying which node the instance is associated with.

It is noted that the illustrated arrangement of the database is merely for discussion purposes. Many other table arrangements with more or fewer tables than illustrated may be used in other implementations.

Figure 10:
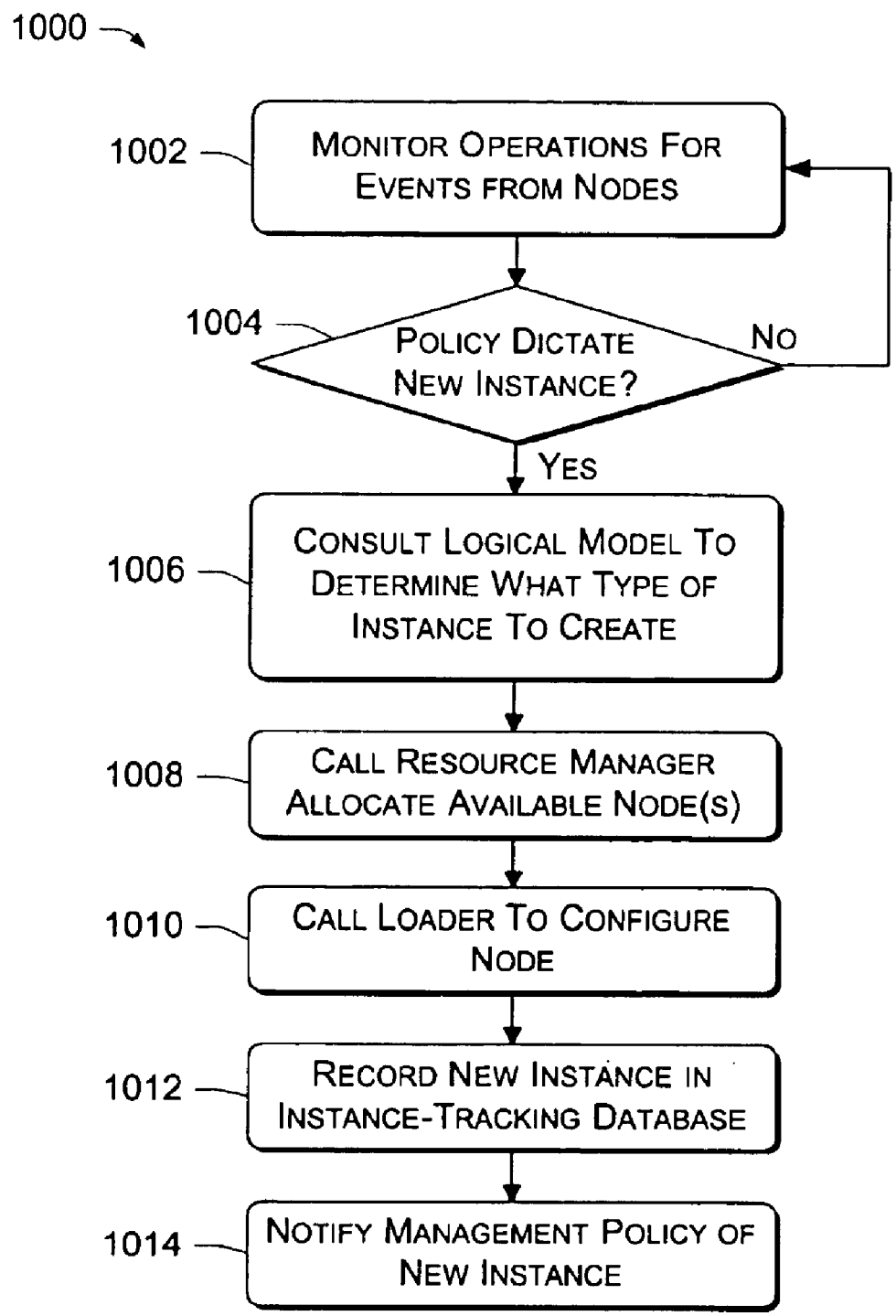
FIG. 10 is a flow diagram of a process for deploying resources for the application based on the logical model.

FIG. 10 shows a method 1000 for deploying resources for an Internet Service based on the logical model. The method 1000 is implemented by the deployment system 700 of FIG. 7 and hence can be embodied as software that, when executed on one or more computers, performs the operations illustrated as blocks in FIG. 10.

At block 1002, the management policy 702 monitors various operating parameters and listens for events from the individual nodes 706 or the core logical-to-physical converter 704. The management policy 702 evaluates the parameters and events against the policy backdrop to determine whether the current physical implementation is satisfactorily supporting the Internet Service, or whether a new instance of some component should be added (block 1004). It is noted that the continuing process is described in the context of adding a new instance. However, the policy may alternatively dictate that one or more instances should be removed. Removal of instances is somewhat easier in that instances are deleted from the instance-tracking database 522 and the computer nodes are returned to the additional pool for reallocation.

Assuming that a new instance is desired (i.e., the "yes" branch from block 1004), the management policy 702 consults the service running state 710 to understand the current number and arrangement of instances (block 1006). The management policy 702 can request various types of information of the service running state 710, such as:

How many instances of a given module?
What nodes are associated with a given model component?
Which ports are attached to a given wire?
What is the network address of a node?
What wire is attached to a port on a given component?
What components does a given component own?

Depending upon the event or operating condition, the management policy 702 can request information on a particular module in the logical model 400. For example, assume that an event has been received from a front end node indicating that the utilization has risen to above 90%. In response, a policy specifying the addition of another instance at such utilization levels is triggered. The management policy 702 asks the service running state 710 how many instances of the front end module currently exist, and information regarding how to specify an instance for the front end module.

At block 1008, the management policy 702 calls the resource manager 716 to request allocation of a new node (assuming one is available). The resource manager 716 examines the resources using data from the resource database 718 and allocates a new node that is currently available from a pool of free nodes. The resource manager 716 records the allocation in the resource database 718, identifying which node is allocated, what application it is being allocated to, the date and time that it is allocated, and so forth.

At block 1010, the management policy 702 calls the loader 722 to install software onto the allocated node and configure the node to perform the functions represented by the logical module from which the instance is created. In response, the loader 722 initializes the node by communicating with the node loader 732 of the new node via the network 708 to install the appropriate software; such an operation might install an image of an operating system (e.g., Windows® NT server operating system from Microsoft Corporation). The loader 722 then loads the appropriate software and configures the node to perform the functions represented by the logical model component from which the instance is derived. For example, for an instance of an SQL module in the logical model 400, the node loader 732 loads SQL server software. The loader 722 registers the physical port addresses with the service running state 710, which records the new instance in the instance-tracking database 522.

At block 1012, the service running state 710 is notified when the newly allocated and configured node is up and running. The service running state 710 records a new instance of the logical model in the instance-tracking database 522. The record reflects an ID of the instance, the name of the logical component from which it is derived, the allocated node, the network addresses of the node, software type and IDs, various protocols supported by the instance, and so on.

At block 1014, the management policy 702 is notified by the core logical-to-physical converter 704 that a new instance is up and running. The new instance should relieve the event or operating condition to bring operation back into compliance with the policy.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method comprising:
    forming a scale-independent logical model of an application to be implemented by a distributed computer system, the model having multiple components representing logical functions of the application; and
    converting individual model components into one or more instances representative of physical resources that are used to implement the logical functions.

2. A method as recited in claim 1, wherein each instance represents a corresponding physical resource in a one-to-one relationship.

3. A method as recited in claim 1, wherein:
    the distributed computer system comprises multiple computing nodes;
    the model components comprise a module that is representative of a functional behavior of the application; and
    an instance of the module corresponds to a node of the distributed computer system.

4. A method as recited in claim 1, further comprising allocating the physical resources to implement the instances.

5. A method as recited in claim 1, further comprising allocating the physical resources in real time to implement the instances.

6. A method as recited in claim 1, further comprising storing the instances in a database.

7. A method as recited in claim 6, further comprising querying the database to determine a current configuration of the application.

8. A computer-readable medium storing computer-executable instructions that, when executed on a computer, cause the computer to perform acts of:
    forming a scale-independent logical model of an application to be implemented by a distributed computer system, the model having multiple components representing logical functions of the application; and
    converting individual model components into one or more instances representative of physical resources that are used to implement the logical functions.

9. A method comprising:
    constructing an application for a distributed computer system according to a logical model, the logical model having multiple components representing logical functions of the application;

monitoring operation of the application during runtime; and automatically deploying resources of the distributed computer system to the application as operation conditions change.

10. A method as recited in claim 9, wherein the application comprises an Internet service.

11. A method as recited in claim 9, wherein the constructing comprises creating one or more instances of each model component, the instances specifying physical resources used to implement the logical functions.

12. A method as recited in claim 11, further comprising storing the instances in a database.

13. A method as recited in claim 12, further comprising querying the database to determine a current configuration of the application.

14. A method as recited in claim 9, wherein the monitoring comprises receiving events regarding operating conditions of computer nodes in the distributed computer system and evaluating the events against a policy.

15. A method as recited in claim 9, wherein the distributed computer system comprises a plurality of interconnected computer nodes and the logical model comprises a module that is representative of a behavior of the application, and the deploying comprises:

creating one or more instances of each module component of the logical model, the instances specifying physical resources used to implement the behavior of the application; and allocating a node of the distributed computer system for each instance of each module.

16. A method as recited in claim 9, further comprising tracking the resources that are deployed to the application and available resources that have not yet been deployed.

17. A computer-readable medium storing computer-executable instructions that, when executed on a computer, cause the computer to perform acts of:

constructing an application for a distributed computer system according to a logical model, the logical model having multiple components representing logical functions of the application;

monitoring operation of the application during runtime; and automatically deploying resources of the distributed computer system to the application as operation conditions change.

18. A method comprising:

maintaining a logical model of an application for a distributed computer system, the logical model having multiple components representing logical functions of the application;

creating one or more instances of each component in the logical model; and allocating resources of the distributed computer system to implement each of the instances.

19. A method as recited in claim 18, wherein the creating comprises producing multiple identical instances of a component in the logical model to accommodate operating conditions for the logical function represented by the component.

20. A method as recited in claim 18, wherein the distributed computer system comprises a plurality of interconnected computer nodes and the logical model comprises a module that is representative of a behavior of the application, the allocating comprising allocating a node for each instance of each module in the logical model.

21. A method as recited in claim 18, further comprising recording the instances in a database.

22. A method as recited in claim 21, further comprising querying the database to determine a current configuration of the application.

23. A method as recited in claim 18, further comprising tracking the resources that are allocated and correlating the resources with the instances for which the resources are allocated.

24. A computer-readable medium storing computer-executable instructions that, when executed on a computer, cause the computer to perform acts of:

maintaining a logical model of an application for a distributed computer system, the logical model having multiple components representing logical functions of the application;

creating one or more instances of each component in the logical model; and allocating resources of the distributed computer system to implement each of the instances.

25. A method comprising:

maintaining a logical model of an Internet service hosted on a plurality of interconnected computer nodes, the logical model having modules representing logical functions of the Internet service;

creating one or more instances of each module in the logical model;

allocating a computer node for each corresponding instance; and configuring each computer node to perform the logical functions represented by the module from which the corresponding instance is created.

26. A method as recited in claim 25, wherein the configuring comprises loading software onto the computer node.

27. A method as recited in claim 25, wherein the configuring comprises downloading software from a remote location to the computer node via a network.

28. A method as recited in claim 25, wherein the configuring comprises:

initializing the computer node by installing a platform software; and loading a software program that performs the logical functions associated with the instance.

29. A method as recited in claim 25, further comprising tracking the instances that are created in a database.

30. A method as recited in claim 25, further comprising:

adding a new instance of a particular module;

allocating a new computer node for the new instance; and loading software onto the new computer node that performs the logical functions represented by the particular module.

31. A method as recited in claim 25, further comprising:

removing a particular instance of a particular module;

deallocating a computer node associated with the particular instance; and returning the computer node to a pool of available computer nodes.

32. A computer-readable medium storing computer-executable instructions that, when executed on a computer, cause the computer to perform acts of:

maintaining a logical model of an Internet service hosted on a plurality of interconnected computer nodes, the logical model having modules representing logical functions of the Internet service;

creating one or more instances of each module in the logical model;

allocating a computer node for each corresponding instance; and configuring each computer node to perform the logical functions represented by the module from which the corresponding instance is created.

33. A system to deploy an application for a distributed computer system having a plurality of computer nodes, the system comprising:

a logical model of the application, the logical model having multiple components representing logical functions of the application; and a core converter to create one or more instances of the model components and allocate computer nodes of the distributed computer system for the instances to implement the logical functions represented by the model components from which the instances are created.

34. A system as recited in claim 33, wherein the core converter comprises:

a service running state to track the instances created for the model components; and a resource manager to track the computer nodes available to be allocated.

35. A system as recited in claim 33, wherein the core converter comprises a loader to load software on the computers nodes to implement the logical functions.

36. A system as recited in claim 33, wherein the core runtime converter comprises:

a service running state to track the instances created for the model components;

a resource manager to track the computer nodes available to be allocated; and a loader to load software onto the new computer node, the software being executable on the computer node to implement the logical functions represented by the particular model component.

37. A system as recited in claim 33, further comprising a management policy to monitor operation of the application and to specify when new instances of the model components are to be created or removed based on the operation of the application.

38. A system as recited in claim 37, wherein the management policy listens to events generated by the computer nodes as a way to monitor operation of the application.

39. A model conversion system comprising:

a service running state to maintain a logical model of a service application to be implemented by software as instances derived from the logical model and distributed across a plurality of computer nodes, the logical model having multiple components representing logical functions of the application;

a resource manager to allocate computer nodes for the instances; and a loader to load various software onto the computer nodes allocated by the resource manager, the software being executable on the computer nodes to implement the logical functions represented by the model components from which the instances are derived.

40. A system as recited in claim 39, wherein the service running state tracks the instances.

41. A system as recited in claim 39, wherein the resource manager tracks whether the computer nodes are allocated or unallocated.

42. A system as recited in claim 39, further comprising a management policy to monitor operation of the application and to specify when new instances of the model components are to be created or removed based on the operation of the application.

43. A system as recited in claim 42, wherein the management policy listens to events generated by the computer nodes as a way to monitor operation of the application.

44. A system as recited in claim 39, further comprising a node loader resident at each of the computer nodes to install the software onto the computer nodes.

45. A system comprising:

means for maintaining a scale-independent logical model of a service application to be implemented by software distributed across a plurality of computer nodes, the logical model having multiple components representing logical functions of the application;

means for creating one or more instances of the model components according to a desired scale of the service application; and means for allocating the computer nodes to associated instances of the model components, the computer nodes being configured to perform the logical functions represented by the components from which the instances are created.

46. A system as recited in claim 45, further comprising means for tracking the instances.

47. A system as recited in claim 45, further comprising means for tracking the allocated computer nodes.

48. A system as recited in claim 45, further comprising means for facilitating policy that specifies when and what instance of a particular model component is created.

49. A system as recited in claim 45, further comprising means for loading software onto the computer nodes following allocation, the software being executed on the computer nodes to perform the logical functions represented by the components from which the instances are created.

50. One or more computer-readable media comprising computer-executable instructions that, when executed on one or more processors, direct one or more computing devices to:

maintain a logical model of an application to be implemented by software distributed across a plurality of computer nodes, the logical model having multiple components representing logical functions of the application; and convert the model components into one or more instances representative of physical resources used to implement the logical functions.

51. One or more computer-readable media as recited in claim 50, further comprising computer-executable instructions that, when executed on one or more processors, direct one or more computing devices to allocate the physical resources for each of the instances.

52. One or more computer-readable media as recited in claim 50, further comprising computer-executable instructions that, when executed on one or more processors, direct one or more computing devices to track the instances in a database.

53. A computer-readable storage medium storing a data structure, the data structure comprising:

a logical model of an application for a distributed computer system, the logical model having at least one module that represents a functional behavior of the application, at least one port that represents a communication access point for the module, and at least one wire that represents a logical connection between the port of the module and a port of another module;

a first structure to store module information pertaining to one or more module instances of the module that correspond to physical resources used to implement the functional behavior represented by the module;

a second structure to store port information pertaining to one or more port instances of the port; and a third structure to store wire information pertaining to one or more wire instances of the wire.

54. A computer-readable storage medium as recited in claim 53, wherein the module information in the first structure is correlated with the port information in the second structure to associate certain ports with certain modules.

55. A computer-readable storage medium as recited in claim 53, wherein the port information in the second structure is correlated with the wire information in the third structure to associate certain wires with certain ports.

56. A computer-readable storage medium as recited in claim 53, wherein the module information includes data fields selected from a group of fields including an identity of the module instance, an identity of the module in the logical model from which the module instance is created, an identity of a physical computer node on which the module instance is instantiated, an identity of a port for the module, and a protocol supported by the module.

57. A computer-readable storage medium as recited in claim 53, wherein the port information includes data fields selected from a group of fields including an identity of the port instance, an identity of the port in the logical model from which the port instance is created, a network address of a physical computer node on which the port instance is instantiated, an identity of a module with which the port is the communication access point, and a protocol supported by the port.

58. A computer-readable storage medium as recited in claim 53, wherein the wire information includes data fields selected from a group of fields including an identity of the wire instance, an identity of the wire in the logical model from which the wire instance is created, an identity of a port with which the wire is coupled, and a protocol supported by the wire.

59. A distributed computer system having a plurality of computer nodes and configured to deploy an application adapted to a scale-independent model for the distributed computer system therein, the distributed computer system including computer-readable code comprising:

a logical model of the application, the logical model having multiple components representing logical functions of the application; and a core converter to create one or more instances of the model components and allocate computer nodes of the distributed computer system for the instances to implement the logical functions represented by the model components from which the instances are created.

60. The distributed computer system of claim 59, wherein the core converter comprises:

a service running state to track the instances created for the model components; and a resource manager to track the computer nodes available to be allocated.

61. The distributed computer system of claim 59, wherein the core converter comprises a loader to load software on the computers nodes to implement the logical functions.

62. The distributed computer system of claim 59, wherein the core runtime converter comprises:

a service running state to track the instances created for the model components;

a resource manager to track the computer nodes available to be allocated; and a loader to load software onto the new computer node, the software being executable on the computer node to implement the logical functions represented by the particular model component.

63. The distributed computer system of claim 59, further comprising a management policy to monitor operation of the application and to specify when new instances of the model components are to be created or removed based on the operation of the application.

64. The distributed computer system of claim 59, further comprising a management policy to monitor operation of the application and to specify when new instances of the model components are to be created or removed based on the operation of the application, wherein the management policy listens to events generated by the computer nodes as a way to monitor operation of the application.

* * * * *